United States Patent
Gupta et al.

(10) Patent No.: US 10,423,442 B2
(45) Date of Patent: Sep. 24, 2019

(54) PROCESSING JOBS USING TASK DEPENDENCIES

(71) Applicant: International Business Machines Corporation, Armonk, NY (US)

(72) Inventors: Himanshu Gupta, New Delhi (IN); Nitin Gupta, Saharanpur (IN); Sameep Mehta, New Delhi (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 84 days.

(21) Appl. No.: 15/605,339

(22) Filed: May 25, 2017

(65) Prior Publication Data
US 2018/0341516 A1 Nov. 29, 2018

(51) Int. Cl.
*G06F 9/46* (2006.01)
*G06F 9/48* (2006.01)

(52) U.S. Cl.
CPC ............ *G06F 9/466* (2013.01); *G06F 9/4881* (2013.01)

(58) Field of Classification Search
CPC ............................... G06F 9/466; G06F 9/4881
See application file for complete search history.

(56) References Cited

U.S. PATENT DOCUMENTS

| 6,571,215 B1 * | 5/2003 | Mahapatro | G06Q 10/06 705/7.12 |
| 7,321,940 B1 * | 1/2008 | Smith | H04L 47/10 709/230 |

(Continued)

FOREIGN PATENT DOCUMENTS

JP 2015095096 A 5/2015

OTHER PUBLICATIONS

Chen, Qi et al., "Pisces: Optimizing Multi-job Application Execution in MapReduce", IEEE Transactions on Cloud Computing, 2016, 14 pages, IEEE Digital Library.
(Continued)

*Primary Examiner* — Camquy Truong
(74) *Attorney, Agent, or Firm* — Ference & Associates LLC

(57) ABSTRACT

One embodiment provides a method, comprising: receiving a plurality of jobs for processing, wherein each of the plurality of jobs comprises a plurality of tasks and wherein at least one of the plurality of jobs is dependent on another of the plurality of jobs; receiving task dependencies between tasks of the at least one of the plurality of jobs and tasks of the another of the plurality of jobs, wherein the task dependencies identify dependent tasks from the tasks of the at least one of the plurality of jobs and dependee tasks from the tasks of the another of the plurality of jobs; scheduling the processing of the dependent tasks as being based upon only the completed processing of the dependee tasks; and performing job processing of the dependent tasks after processing of the dependee tasks irrespective of the overall job processing status of the another of the plurality of jobs.

16 Claims, 4 Drawing Sheets

(56) References Cited

U.S. PATENT DOCUMENTS

| | | | |
|---|---|---|---|
| 7,406,689 B2* | 7/2008 | Berstis | G06F 9/4881 709/223 |
| 2008/0022288 A1* | 1/2008 | Bekooij | G06F 9/4887 718/107 |
| 2011/0283292 A1* | 11/2011 | Saffre | G06F 9/5088 718/104 |
| 2014/0297585 A1 | 10/2014 | Chawda et al. | |
| 2016/0275123 A1 | 9/2016 | Lin et al. | |

OTHER PUBLICATIONS

Yao, Yi et al., "HaSTE: Hadoop Yarn Scheduling Based on Task-Dependency and Resource-Demand", Cloud '14, Proceedings of the 2014 IEEE International Conference on Cloud Computing, Jun. 27-Jul. 2, 2014, pp. 184-191, IEEE Computer Society, Washington, DC, USA, ACM Digital Library.

Condie, Tyson et al., "Online Aggregation and Continuous Query support in MapReduce", SIGMOD '10, Jun. 6-11, 2010, Indianapolis, Indiana, USA, 4 pages, ACM Digital Library.

Wolf, Joel et al., "On the optimization of schedules for MapReduce workloads in the presence of shared scans", The VLDB Journal—The International Journal on Very Large Data Bases, Oct. 2012, pp. 589-609, vol. 21, Issue 5, ACM Digital Library.

Bu, Yingyi et al., "HaLoop: Efficient Iterative Data Processing on Large Clusters", Proceedings of the VLDB Endowment, The 36th International Conference on Very Large Data Bases, Sep. 13-17, 2010, Singapore, 12 pages, vol. 3, Issue 1-2, ACM Digital Library.

Bhatotia, Pramod et al., "Incoop: MapReduce for Incremental Computations", SOCC '11, Oct. 27-28, 2011, Cascais, Portugal, 14 pages, ACM Digital Library.

\* cited by examiner

PROCESSING JOBS USING TASK DEPENDENCIES

BACKGROUND

Different techniques exist for processing information. One common technique for processing information, particularly large volumes of information, is using a MapReduce program. A MapReduce program allows for processing and generating large sets of information using a parallel, distributed algorithm. A MapReduce program includes a Map function that performs a user-defined function on all records of input data and transforms the input to a set of key-value pairs. Secondly, a MapReduce program includes a Reduce function that processes the Map function output and applies a user-defined function on the set of map output key-value pairs. The MapReduce program is typically implemented in different software frameworks. For example, the MapReduce may be implemented in JAVA® as HADOOP®.

BRIEF SUMMARY

In summary, one aspect of the invention provides a method, comprising: utilizing at least one processor to execute computer code that performs the steps of: receiving a plurality of jobs for processing, wherein each of the plurality of jobs comprises a plurality of tasks and wherein at least one of the plurality of jobs is dependent on another of the plurality of jobs; receiving task dependencies between (i) tasks of the at least one of the plurality of jobs and (ii) tasks of the another of the plurality of jobs, wherein the task dependencies identify dependent tasks from the tasks of the at least one of the plurality of jobs and identify dependee tasks from the tasks of the another of the plurality of jobs; scheduling, using the identified task dependencies, the processing of the dependent tasks as being based upon only completed processing of the dependee tasks; and performing, based upon the scheduling, processing of the dependent tasks after processing of the dependee tasks, irrespective of the overall job processing status of the another of the plurality of jobs.

Another aspect of the invention provides an apparatus, comprising: at least one processor; and a computer readable storage medium having computer readable program code embodied therewith and executable by the at least one processor, the computer readable program code comprising: computer readable program code that receives a plurality of jobs for processing, wherein each of the plurality of jobs comprises a plurality of tasks and wherein at least one of the plurality of jobs is dependent on another of the plurality of jobs; computer readable program code that receives task dependencies between (i) tasks of the at least one of the plurality of jobs and (ii) tasks of the another of the plurality of jobs, wherein the task dependencies identify dependent tasks from the tasks of the at least one of the plurality of jobs and identify dependee tasks from the tasks of the another of the plurality of jobs; computer readable program code that schedules, using the identified task dependencies, the processing of the dependent tasks as being based upon only the completed processing of the dependee tasks; and computer readable program code that performs, based upon the scheduling, processing of the dependent tasks after processing of the dependee tasks, irrespective of the overall job processing status of the another of the plurality of jobs.

An additional aspect of the invention provides a computer program product, comprising: a computer readable storage medium having computer readable program code embodied therewith, the computer readable program code executable by a processor and comprising: computer readable program code that receives a plurality of jobs for processing, wherein each of the plurality of jobs comprises a plurality of tasks and wherein at least one of the plurality of jobs is dependent on another of the plurality of jobs; computer readable program code that receives task dependencies between (i) tasks of the at least one of the plurality of jobs and (ii) tasks of the another of the plurality of jobs, wherein the task dependencies identify dependent tasks from the tasks of the at least one of the plurality of jobs and identify dependee tasks from the tasks of the another of the plurality of jobs; computer readable program code that schedules, using the identified task dependencies, the processing of the dependent tasks as being based upon only the completed processing of the dependee tasks; and computer readable program code that performs, based upon the scheduling, processing of the dependent tasks after processing of the dependee tasks, irrespective of the overall job processing status of the another of the plurality of jobs.

A further aspect of the invention provides a method, comprising: utilizing at least one processor to execute computer code that performs the steps of: receiving a plurality of jobs for job processing, each job comprising a plurality of tasks; identifying job dependencies between the plurality of jobs, wherein the job dependencies identify a first of the plurality of jobs that is dependent on a second of the plurality of jobs; identifying task dependencies from the jobs having dependencies, wherein the task dependencies identify at least one dependent task from the first of the plurality of jobs that is dependent on at least one dependee task from the second of the plurality of jobs; and processing the at least one dependent task once the corresponding at least one dependee task has finished processing regardless of the overall processing completion status of the dependee job.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
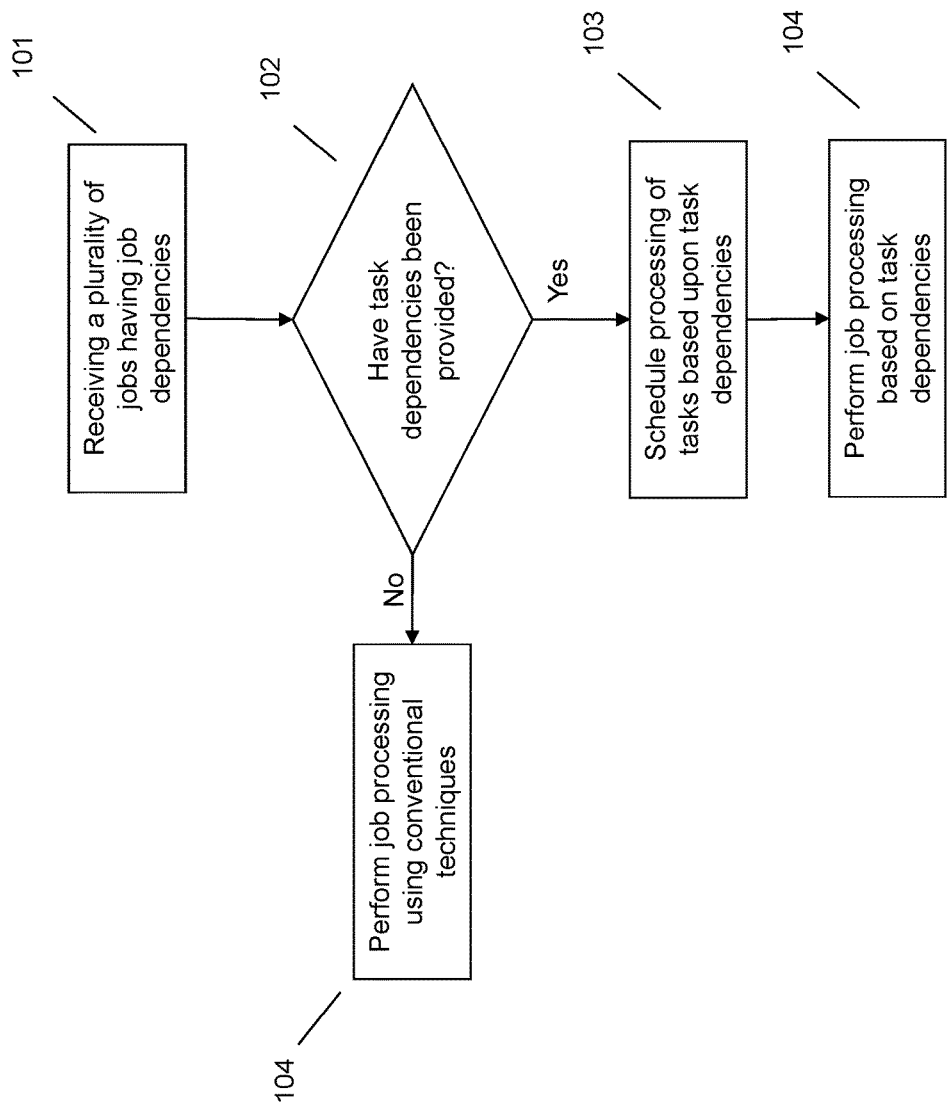
FIG. 1 illustrates a method of processing jobs using task dependencies.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

A MapReduce application includes two phases, a Map phase and a Reduce phase. The map functions first perform the assigned operation on each record in the input and the map-reduce framework then shuffles the map-output to the reducers. The reduce functions then process the shuffled data and generate the final output. The system may have many map tasks performing map functions and many reduce tasks performing reduce functions. Often MapReduce applications include multiple cycles. In a two-cycle MapReduce application, the final output of the reduce phase of the first cycle is passed to the map phase of the second cycle. In traditional multi-cycle MapReduce applications, before the final output can be passed to the second cycle, the first cycle must be completely finished. This generates bottlenecks and slows processing times because the second cycle cannot start until the first cycle has finished. This is because it is not known a priori which tasks in the second map-reduce cycle depend on which tasks of the first map-reduce cycle, so it is assumed that each task in the second cycle is dependent on each task in the first cycle.

In the systems and methods as described herein, a map-reduce framework is provided where the task dependencies across two, or more, map-reduce cycles are specified upfront. These dependencies can then be exploited in a number of ways to improve the efficiency of map-reduce. These task dependencies are specified by the application writer. The application writer knows the application semantics so he/she can provide the list of such dependencies. In conventional map-reduce frameworks there is no feature of taking task dependencies across two or more cycles as input and then exploiting it.

Accordingly, an embodiment provides a method of exploiting tasks dependencies within the jobs in order to start the second cycle even if the first cycle has not completely finished. The system may receive a plurality of jobs for processing where at least one of the jobs is dependent on another job. In some cases more than one job may be dependent on a single job. For example, a single job may have two or more dependent jobs. Each job may include a plurality of tasks that have to be processed in connection with the job processing. For example, each job may include one or more map phase tasks and one or more reduce phase tasks. The system is provided the task dependencies between the jobs. In other words, the system is provided the input of which tasks from the downstream job (referred to herein as the dependent job for ease of readability) are dependent on which tasks from the upstream job (referred to herein as the dependee job for ease of readability). The application writer specifies the dependent tasks and the corresponding dependee tasks.

It should be noted that map tasks operate on a per record basis while the input of reduce task may come from the output of multiple map tasks. Therefore, as soon as a reduce task of a dependee job finishes, its output can be immediately fed to the map task of the dependent job. If there are two dependent jobs, then the reduce task output can be separately fed to the map tasks of the two dependent jobs. In this fashion, we can group the map computation with the reduce tasks of the dependee jobs and we can visualize a multi-cycle map-reduce job as a collection of reduce tasks only. Note that the input to a reduce task may be formed by the output of multiple other reduce tasks. When we talk of task dependencies in this disclosure, we talk of the dependencies among these reduce tasks.

The system may then schedule the processing of the tasks based upon the input task dependencies. When scheduling the processing of the tasks, the system may take into account which tasks from the dependent job can be started when certain tasks from the dependee job are completed. The system may then perform the processing of the dependent task(s) after the dependee tasks have completed processing, regardless of the overall job processing status of the dependee job. In other words, the second, or subsequent, cycle in the job processing may begin as soon as there is a dependent task in the second cycle for which all of its dependee tasks are processed.

Exploiting the task dependencies between jobs or cycles produces a system which can reduce waiting and overall processing time of the plurality of jobs. For example, a dependent task can be started after all dependee tasks have been completed, even if all of the tasks in an upstream phase have not be completed or even started.

The system as described herein can also reduce the communication costs by co-locating the set of dependee and dependent tasks on the same machine. The output of dependee tasks needs to be communicated to the dependent tasks, so if such tasks are executed on different machines, this will involve a data transfer across machines. In the system and methods as described herein, the system can schedule the dependee and corresponding dependent tasks on the same machine. Accordingly, no data transfer will be necessary. Conventional map-reduce frameworks fail to take task dependencies as input and, accordingly, will not be able to co-locate such tasks.

The system as described herein can also reduce overall computation if only a partial output is needed. Often the users are interested in computing only part of the output and this implies that only a subset of the tasks in the final map-reduce cycle need to be executed. For example, if only four tasks out of ten tasks of a particular phase need to be completed, only the tasks on which those four tasks are dependent need to be processed. Any other tasks having no connection or dependency to the four tasks do not need to be processed.

Additionally, based upon the dependencies among various tasks, the system may judiciously schedule tasks on machines with better configurations. For example, if one task has many dependee tasks, that task will likely receive a larger volume of data as compared to tasks having fewer dependee tasks. Accordingly, the system may schedule this task a machine with has a better configuration. This task may then be finished in a comparatively smaller time.

Such a system provides a technical improvement over current job processing systems by exploiting task dependencies, rather than relying on job dependencies. The systems and methods as described herein provide a feature of taking task dependencies as input and also describes multiple techniques of exploiting these dependencies. These techniques include scheduling the processing of the tasks to rely merely upon completion of any dependee tasks rather than relying on completion of the entire job. Accordingly, the system and methods as described herein reduces processing and waiting time, reduces communication costs by co-locating tasks having a dependency and pruning computation when only a partial output is needed, and more effectively assigning and scheduling resources to complete tasks.

Referring now to FIG. 1, at 101, the system may receive a plurality of jobs for processing. The requested processing algorithm may include one or more map functions and one or more reduce functions. In other words, the system for processing the information may include one or more mappers for carrying out the map function and one or more reducers for carrying out the reduce function. As an example, the system may use a HADOOP® framework for processing information. The HADOOP® framework may include a HADOOP® distributed file system for storing the information which is shared across the different machines that process the information.

The plurality of jobs may include one or more jobs that are dependent on one or more of the other jobs. In other words, the plurality of jobs may include one or more dependent jobs that are dependent on one or more dependee jobs. As an example, in a multi-cycle application, a map phase of second job may be dependent on the output from the reduce phase of the first job. In the job dependencies, the dependent job or phase cannot start processing until the dependee job or phase has completed processing. Each of the jobs may include a plurality of tasks. For example, a job may have multiple tasks included in the map phase and multiple tasks included in the reduce phase.

At 102, the system may determine whether task dependencies have been specified between tasks of a dependent job and corresponding dependee job. A dependent job may include a job that is dependent on another job, and the dependee job may include the job on which the dependent job is dependent. A single dependent job may have more than one dependee job. Similarly, a dependee job may have more than one dependent job. In other words, a single job may require the output of more than one job, and, conversely, a job may provide input to more than one job. Additionally, tasks of a dependent job may be referred to herein as dependent tasks, and the tasks which the dependent task(s) are dependent upon may be referred to herein as dependee tasks.

The task dependencies may be identified through input by an application developer. When the application developer develops the application, the developer may provide details on which tasks are dependent on other tasks. The task dependencies may include task dependencies between jobs. As an example, tasks of a map phase of one job may be dependent on the output from reduce tasks of a reduce phase of another job. Accordingly, the dependent tasks may include one or more map tasks, or, alternatively, may include one or more reduce tasks. Similarly, dependee tasks may include one or more reduce tasks, or, alternatively, may include one or more map tasks. The task dependencies may be illustrated or represented as a dependency graph, for example, a dependency graph, a directed acyclic graph, and the like.

If no task dependencies have been provided as input at 102, the system may perform job processing using conventional techniques at 104. If, however, task dependencies have been provided as an input at 102, the system may schedule the processing of the tasks based upon the provided task dependencies at 103. The scheduling may include basing the processing of a task only on the completed processing of any dependee tasks. Accordingly, the scheduling may include scheduling the processing of a task of a dependent job even if the overall job processing of the dependee job has not been completed.

Figures 2A, 2B:
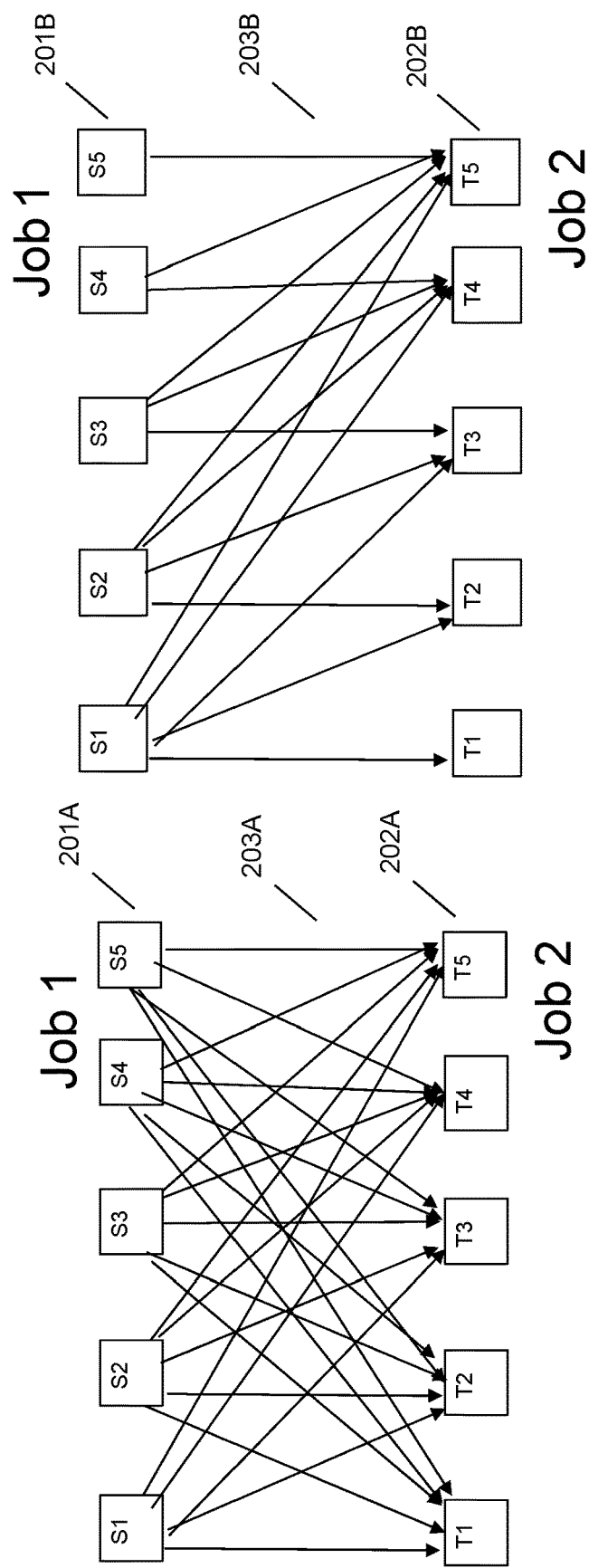
FIG. 2A illustrates an example perceived task dependency graph based on job dependencies.
FIG. 2B illustrates an example task dependency graph based upon user-specified task dependencies.

For example, FIGS. 2A and 2B show perceived and actual task dependencies for a certain real-life application. If no task dependencies are specified, the system has to assume that all tasks in the second cycle are dependent on all the tasks in the first cycle. FIG. 2A illustrates such a scenario. In the case of conventional techniques where only job level dependencies are specified, FIG. 2A illustrates the perceived task dependencies between the jobs. Job 1 includes five tasks 201A and Job 2, which is dependent on Job 1, includes five tasks 202A. Based upon the dependency of Job 2 on Job 1, the system perceives that every task of Job 2 202A is dependent on every task of Job 1 201A. Accordingly, the perceived task dependencies are illustrated by the dependency arrows 203A.

FIG. 2B illustrates the actual task dependencies between the same Job 1 and Job 2 based upon identification of the task dependencies. Job 1 includes the same five tasks 202A and FIG. 2A, and Job 2 includes the same five tasks 202B as FIG. 2A. However, because the task dependencies have been identified, the task dependency arrows 203B are greatly reduced. For example, T1 of Job 2 is only dependent on S1 of Job 1, rather than being dependent on every task of Job 1 as in FIG. 2A.

At 104 the system may perform the processing based upon the schedule created at 103. In other words, the processing may be based upon the task dependencies identified at 102. Performing the processing may include processing the dependent tasks after any dependee tasks have completed processing irrespective of the overall job processing status of any dependee jobs. In other words, once the dependee tasks have been completed, a corresponding dependent task may begin processing, even if not all tasks of the dependee job have completed or even started processing.

Figure 3:
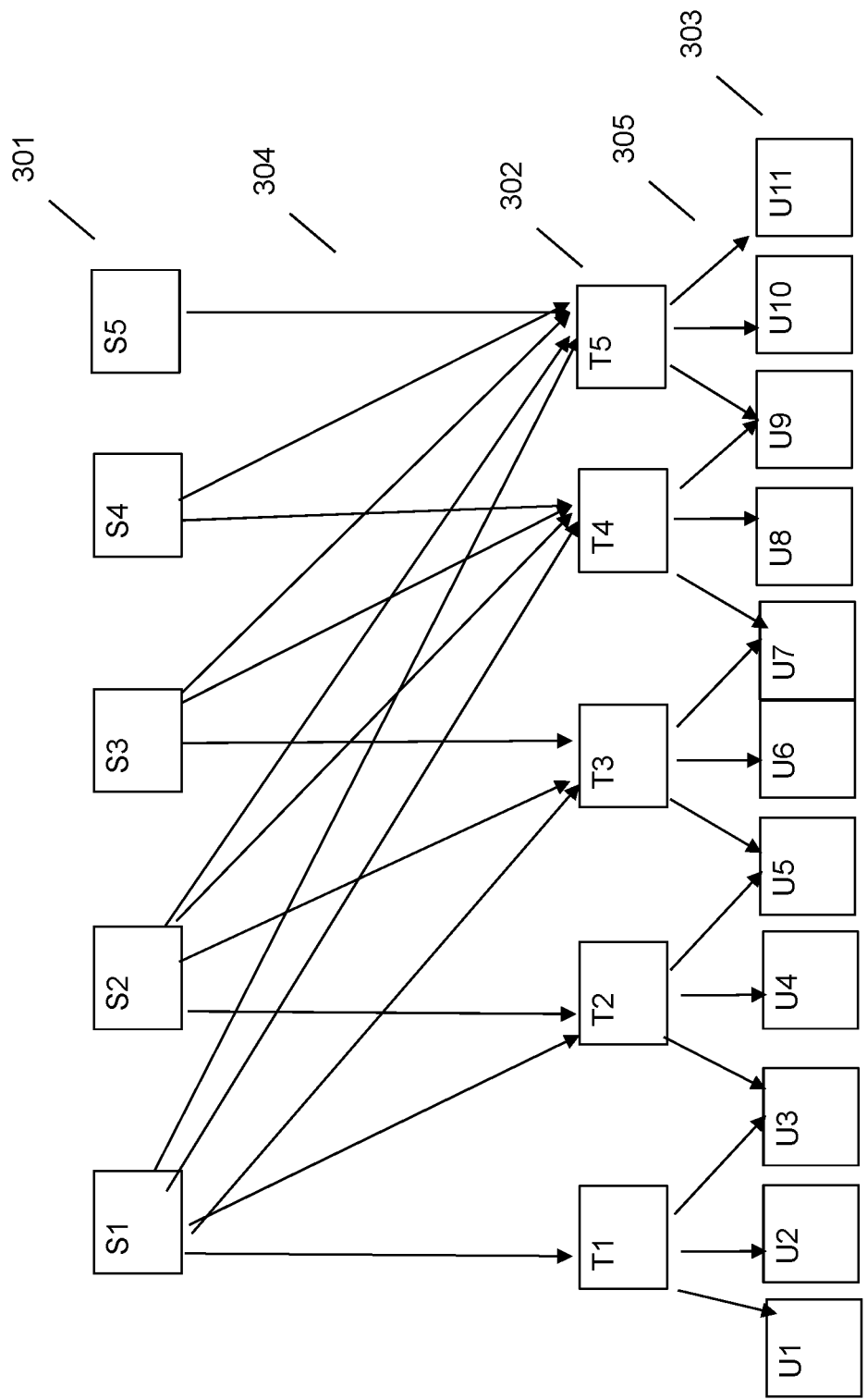
FIG. 3 illustrates an example job/task dependency graph.

The task dependencies, and scheduling and processing thereof, can be exploited to reduce waiting and processing time, reduce communication cost, and optimize resource allocation. The example in FIG. 3 will be used to explain how the task dependencies can be exploited. FIG. 3 illustrates a first job or phase having five tasks (S1-S5) 301, a second job or phase having five tasks (T1-T5) 302, including dependency arrows 304 between the first job or phase and the second job or phase, and a third job or phase having eleven tasks (U1-U11) 303, including dependency arrows 305 between the second job or phase and the third job or phase.

The task dependencies, and scheduling and processing thereof, may be exploited to reduce the wait and/or processing time for job and/or task processing. In a conventional system, the processing of tasks from one job cannot be started until the processing of the tasks from a preceding job are completed. Using the example of FIG. 3, none of the tasks T1-T5 302 can start processing until all of the tasks S1-S5 301 have been completed, thereby causing a performance bottleneck.

However, using the systems and methods as described herein, the processing of one task can begin as soon as any dependee tasks have completed processing, thereby alleviating the bottleneck, wait time, and overall processing time. Again, using the example of FIG. 3, task T1 can start processing as soon as task S1 has completed processing because S1 is the only dependee task for T1. In the conventional system, T1 will need to wait, even if machines are idle, until all tasks S1-S5 have been finished. Similarly, task T5 cannot start processing until tasks S1-S5 have completed processing because task T5 is dependent on all of tasks S1-S5. Such a system is additionally helpful in the case of straggling tasks. A straggling task is one which takes an unusually longer time to finish than other tasks in the job. Due to the ability to perform processing on downstream tasks that are not dependent on the straggling task, the overall processing time can be reduced. Additionally, the entire processing of the downstream jobs is not halted waiting on the straggling task(s) to finish.

The systems and methods as described herein can also be exploited to reduce communication cost of the processing. If a dependent task and corresponding dependee task are scheduled on different machines, a data transfer is required to transfer the output of the dependee task to the machine where the dependent task is processing. Accordingly, the systems and methods as described herein can include scheduling any tasks having dependencies there-between for processing on the same machine. For example, referring to FIG. 3, tasks S1, S2, and T2 may be scheduled for processing on the same machine. Since the only dependee tasks of T2 are S1 and S2, T2 does not need to fetch data from any other machine because the output of S1 and S2 is available locally. Thus, the communication cost of the processing may be reduced. Additionally, the processing time may be reduced because extra data transfers are not required.

Communications costs may also be reduced by pruning computation in the case that only partial output is needed. The system or a user may identify a subset of the tasks that are necessary for providing a desired partial final output. Using the identified task dependencies, the system may identify which tasks upstream are required for processing to provide the desired final partial output. The system may then schedule and process the identified tasks accordingly. For example, referring to FIG. 3, if only the output of tasks U1-U5 is required for the partial output, the system can identify the corresponding dependee tasks. In this example, the system would identify that tasks T1-T3 and tasks S1-S3 need to be processed to provide the desired partial output. Thus, rather than having to perform processing on all the tasks, as would be required using conventional techniques, the system can perform processing only the necessary tasks, thereby reducing processing time and communication costs.

The task dependencies may also be exploited to assign processing resources. The system may identify and assign processing resources to tasks based upon the number of dependee tasks or expected data input to the task. As an example, the system may assign a dependent task which has a larger number of dependee tasks, as compared to other dependent tasks, to a machine with a better configuration. In this case, the system may identify that the dependent task will receive an influx of data from the dependee tasks greater than the influx of data to the other dependent tasks. Using FIG. 3 as an example, the system may identify that task T5 has five dependee tasks. Accordingly, the system may assign more processing resources to T5 with respect to the other dependent tasks in order to process the larger volume of data expected at T5.

Figure 4:
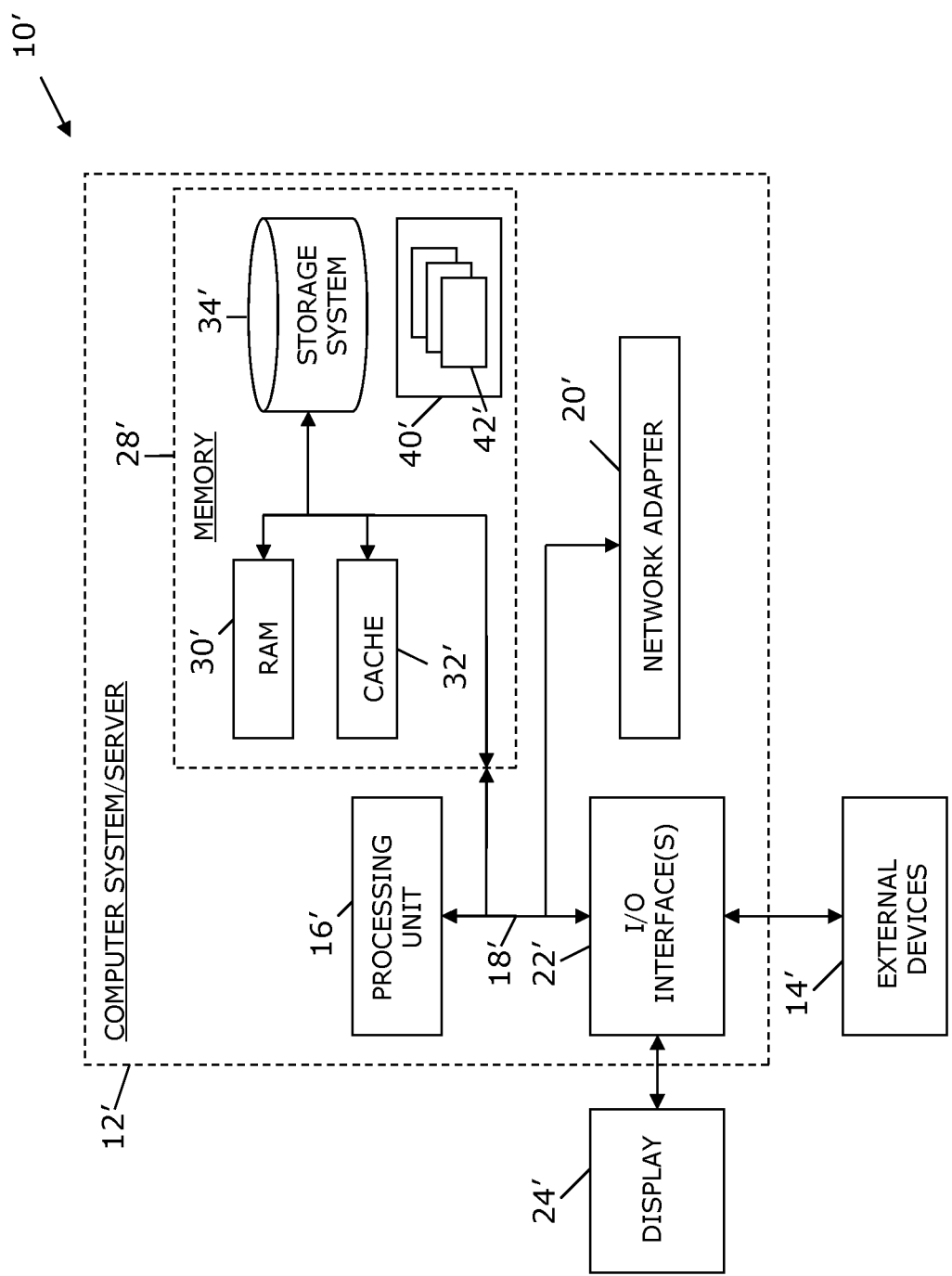
FIG. 4 illustrates a computer system.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
   utilizing at least one processor to execute computer code that performs the steps of:
   receiving a plurality of jobs for computer processing, wherein each of the plurality of jobs comprises a plurality of tasks and wherein at least a subset of the plurality of jobs are provided in a multi-cycle application where at least one of the tasks of one of the plurality of jobs is dependent on at least one task of another of the plurality of jobs;
   receiving task dependencies between (i) tasks of the at least one of the plurality of jobs and (ii) tasks of the another of the plurality of jobs, wherein the task dependencies identify dependent tasks from the tasks of the at least one of the plurality of jobs and identify dependee tasks from the tasks of the another of the plurality of jobs;
   scheduling, using the identified task dependencies, the processing of the dependent tasks as being based upon only completed processing of the dependee tasks; and
   performing, based upon the scheduling, processing of the dependent tasks after processing of the dependee tasks, irrespective of whether all of the tasks of the another of the plurality of jobs have been processed;
   wherein the assigning processing resources comprises assigning more processing resources to those dependent tasks having a larger number of dependee tasks as compared to other dependent tasks; and
   wherein the scheduling and the performing job processing comprises scheduling and performing job processing of the subset of the plurality of tasks and the dependee tasks correlating to the subset of the plurality of tasks.

2. The method of claim 1, wherein the receiving task dependencies comprises receiving task dependency information from a user.

3. The method of claim 1, wherein the dependent tasks comprise at least a subset of map phase tasks of the at least one of the plurality of jobs.

4. The method of claim 1, wherein the dependee tasks comprise at least a subset of reduce phase tasks of the another of the plurality of jobs.

5. The method of claim 1, wherein the job processing of the dependent tasks starts before the overall job processing of the another of the plurality of jobs is complete.

6. The method of claim 1, wherein the dependee tasks and corresponding dependent tasks are scheduled for processing on a single machine.

7. The method of claim 1, comprising receiving a request for partial final job output and identifying a subset of the plurality of tasks of the at least one of the plurality of jobs necessary for providing the partial final output.

8. The method of claim 1, wherein the performing job processing comprises assigning processing resources to the dependent tasks based upon the number of dependee tasks corresponding to the dependent tasks.

9. An apparatus, comprising:
   at least one processor; and
   a computer readable storage medium having computer readable program code embodied therewith and executable by the at least one processor, the computer readable program code comprising:
   computer readable program code that receives a plurality of jobs computer processing, wherein each of the plurality of jobs comprises a plurality of tasks and wherein at least a subset of the plurality of jobs are provided in a multi-cycle application where at least one of the tasks of one of the plurality of jobs is dependent on at least one task of another of the plurality of jobs;
   computer readable program code that receives task dependencies between (i) tasks of the at least one of the plurality of jobs and (ii) tasks of the another of the plurality of jobs, wherein the task dependencies identify dependent tasks from the tasks of the at least one of the plurality of jobs and identify dependee tasks from the tasks of the another of the plurality of jobs;
   computer readable program code that schedules, using the identified task dependencies, the processing of the dependent tasks as being based upon only completed processing of the dependee tasks; and
   computer readable program code that performs, based upon the scheduling, processing of the dependent tasks after processing of the dependee tasks, irrespective of whether all of the tasks of the another of the plurality of jobs have been processed;

wherein the assigning processing resources comprises assigning more processing resources to those dependent tasks having a larger number of dependee tasks as compared to other dependent tasks; and wherein the scheduling and the performing job processing comprises scheduling and performing job processing of the subset of the plurality of tasks and the dependee tasks correlating to the subset of the plurality of tasks.

10. A computer program product, comprising:

a non-transitory computer readable storage medium having computer readable program code embodied therewith, the computer readable program code executable by a processor and comprising:

computer readable program code that receives a plurality of jobs computer processing, wherein each of the plurality of jobs comprises a plurality of tasks and wherein at least a subset of the plurality of jobs are provided in a multi-cycle application where at least one of the tasks of one of the plurality of jobs is dependent on at least one task of another of the plurality of jobs;

computer readable program code that receives task dependencies between (i) tasks of the at least one of the plurality of jobs and (ii) tasks of the another of the plurality of jobs, wherein the task dependencies identify dependent tasks from the tasks of the at least one of the plurality of jobs and identify dependee tasks from the tasks of the another of the plurality of jobs;

computer readable program code that schedules, using the identified task dependencies, the processing of the dependent tasks as being based upon only completed processing of the dependee tasks; and computer readable program code that performs, based upon the scheduling, processing of the dependent tasks after processing of the dependee tasks, irrespective of whether all of the tasks of the another of the plurality of jobs have been processed, wherein the assigning processing resources comprises assigning more processing resources to those dependent tasks having a larger number of dependee tasks as compared to other dependent tasks; and wherein the scheduling and the performing job processing comprises scheduling and performing job processing of the subset of the plurality of tasks and the dependee tasks correlating to the subset of the plurality of tasks.

11. The computer program product of claim 10, wherein the dependent tasks comprise at least a subset of map phase tasks of the at least one of the plurality of jobs.

12. The computer program product of claim 10, wherein the dependee tasks comprise at least a subset of reduce phase tasks of the another of the plurality of jobs.

13. The computer program product of claim 10, wherein the job processing of the dependent tasks starts before the overall job processing of the another of the plurality of jobs is complete.

14. The computer program product of claim 10, wherein the dependee tasks and corresponding dependent tasks are scheduled for processing on a single machine.

15. The computer program product of claim 10, comprising receiving a request for partial final job output and identifying a subset of the plurality of tasks of the at least one of the plurality of jobs necessary for providing the partial final output.

16. A method, comprising:

utilizing at least one processor to execute computer code that performs the steps of:

receiving a plurality of jobs for computer job processing, each job comprising a plurality of tasks, wherein at least a subset of the plurality of jobs are provided in a multi-cycle application;

identifying job dependencies between the plurality of jobs, wherein the job dependencies identify a first of the plurality of jobs that is dependent on a second of the plurality of jobs;

identifying task dependencies from the jobs having dependencies, wherein the task dependencies identify at least one dependent task from the first of the plurality of jobs that is dependent on at least one dependee task from the second of the plurality of jobs; and processing the at least one dependent task once the corresponding at least one dependee task has finished processing regardless of whether all of the tasks of the dependee job have been processed;

wherein the assigning processing resources comprises assigning more processing resources to those dependent tasks having a larger number of dependee tasks as compared to other dependent tasks; and wherein the scheduling and the performing job processing comprises scheduling and performing job processing of the subset of the plurality of tasks and the dependee tasks correlating to the subset of the plurality of tasks.

* * * * *